US011746446B2

(12) United States Patent
Sakai et al.

(10) Patent No.: US 11,746,446 B2
(45) Date of Patent: Sep. 5, 2023

(54) NON-COATED AIRBAG BASE FABRIC, COATED AIRBAG BASE FABRIC, AND AIRBAG USING SAME

(71) Applicant: TOYOBO CO., LTD., Osaka (JP)

(72) Inventors: Masahiro Sakai, Otsu (JP); Yosihiro Matsui, Osaka (JP); Kenichiro Kano, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/976,297

(22) PCT Filed: Feb. 22, 2019

(86) PCT No.: PCT/JP2019/006701
§ 371 (c)(1),
(2) Date: Aug. 27, 2020

(87) PCT Pub. No.: WO2019/167820
PCT Pub. Date: Sep. 6, 2019

(65) Prior Publication Data
US 2021/0040655 A1    Feb. 11, 2021

(30) Foreign Application Priority Data

Feb. 28, 2018 (JP) ................................ 2018-034241
Jan. 23, 2019 (JP) ................................ 2019-009344

(51) Int. Cl.
| | | |
|---|---|---|
| D03D 1/02 | (2006.01) | |
| B60R 21/235 | (2006.01) | |
| D06M 15/643 | (2006.01) | |
| D03D 15/283 | (2021.01) | |
| D03D 15/40 | (2021.01) | |
| D06M 101/16 | (2006.01) | |

(52) U.S. Cl.
CPC ............ *D03D 1/02* (2013.01); *B60R 21/235* (2013.01); *D03D 15/283* (2021.01); *D03D 15/40* (2021.01); *D06M 15/643* (2013.01); *B60R 2021/23509* (2013.01); *B60R 2021/23514* (2013.01); *B60R 2021/23542* (2013.01); *D06M 2101/16* (2013.01); *D10B 2331/02* (2013.01); *D10B 2505/124* (2013.01); *Y10T 442/172* (2015.04); *Y10T 442/2008* (2015.04); *Y10T 442/2893* (2015.04); *Y10T 442/3317* (2015.04); *Y10T 442/3553* (2015.04)

(58) Field of Classification Search
None
See application file for complete search history.

(56) References Cited

U.S. PATENT DOCUMENTS

| | | |
|---|---|---|
| 2002/0155774 A1 | 10/2002 | Kitamura et al. |
| 2015/0017859 A1 | 1/2015 | Akechi et al. |
| 2015/0079864 A1 | 3/2015 | Nishimura et al. |
| 2018/0093634 A1 | 4/2018 | Hosaka et al. |

FOREIGN PATENT DOCUMENTS

| | | |
|---|---|---|
| CN | 101348962 | 1/2009 |
| CN | 101421451 | 4/2009 |
| CN | 104278392 | 1/2015 |
| CN | 107407017 | 11/2017 |
| JP | H10-37039 | 2/1998 |
| JP | 2002/317343 | 10/2002 |
| JP | 2007-284826 | 11/2007 |
| JP | WO2019/167820 | 1/2021 |
| WO | 2013/118755 | 8/2013 |
| WO | 2013/168730 | 11/2013 |
| WO | 2015/050004 | 4/2015 |

OTHER PUBLICATIONS

Japan Patent Office, PCT International Search Report and Written Opinion in International Appln. No. PCT/JP2020/002405, dated Mar. 17, 2020, 9 pages, with partial English translation.
Japan Patent Office, International Search Report for PCT/JP2019/006701 dated Apr. 10, 2019 with English translation.
EPO Communication with Supplemental European Search Report in European Appln. No. 19761417,5, dated Oct. 29, 2021, 8 pages.
CN Office Action in Chinese Appln. No. 202080010383.4, dated Apr. 14, 2022, 13 pages, with English Translation.
Japan Patent Office, JP Office Action in Japanese Appln. No. 2020-568207, dated Feb. 21, 2023, 9 pages, with English Translation.

*Primary Examiner* — Arti Singh-Pandey
(74) *Attorney, Agent, or Firm* — Fish & Richardson P.C.

(57) ABSTRACT

A technical problem to be solved by the present invention is to provide a non-coated fabric for airbags and a coated fabric for airbags that are both less likely to have yarn slippage after being sewn, and that can be compactly stored; and airbags using these fabrics. The fabric for airbags according to the present invention is a non-coated fabric for airbags or a coated fabric for airbags that both have a crimp ratio of 12% or more in the warp direction, and a crimp ratio of 61 or less in the weft direction.

12 Claims, No Drawings

NON-COATED AIRBAG BASE FABRIC, COATED AIRBAG BASE FABRIC, AND AIRBAG USING SAME

TECHNICAL FIELD

The present invention relates co a non-coated fabric for airbags, a coated fabric for airbags, and airbags using these fabrics.

BACKGROUND ART

Airbags have been widely used as safety equipment for protecting occupants in a vehicle collision. A woven fabric coated with, for example, silicone rubber has bean used in fabrics for airbags to ensure low air portability so that the leakage of gas ejected from the inflator is prevented. However, while having high heat resistance as well as such air permeability, a "coated airbag" prepared from such a surface-coated woven fabric not only entails considerable costs for the coating treatment, but also exhibits poor packageability due to the heavy weight and thickness of the fabric itself. It is becoming difficult to meet the market demands for weight reduction and sire reduction of coated airbags. Thus, studies have been conducted on airbags prepared from a non-coated fabric for airbags, the surface of which is not coated ("non-coated airbag"). However, in order to obtain a non-coated airbag that achieves air permeability equivalent to that of coated airbags, the fabric must have a high weaving density.

Additionally, due to the growing demand for safety performance, the installation of airbags in various spots in automobiles has been becoming common. In particular, a coated fabric has been applied to curtain airbags, among these airbags, to satisfy the required performance, and such a component wide in the width direction is sewn into a bag. Thus, there is increasing demand for a fabric that can be easily folded when folded in one direction; in particular, there is increasing demand for a fabric that can be easily folded when folded in a warp direction so that the component can be efficiently cut. Additionally, cut-out, conventional fabrics for airbags are prone to yarn slippage after being sewn.

A technique concerning fabrics applicable to a component wide in the width direction, such as curtain airbags, is known in which the amount of an oil agent applied to original yarn is determined so as to result in a specific friction coefficient against metal and to control the amount of an applied coating agent, thereby preparing a fabric excellent in packageability, suitable for curtain airbags (e.g., PTL 1). However, such a technique may lead to deterioration of packageability when the fabric has a high weaving density.

Moreover, due to increasing safety awareness for pedestrians and vehicle occupants, there has been demand for further decreased air permeability as well as heat resistance than ever before. There is concern that only subjecting a fabric of a usual weaving density to coating treatment does not enable a coated airbag to exhibit a required performance. Thus, in order to achieve the required low air permeability and heat resistance, a fabric with a high weaving density must be coated.

CITATION LIST

Patent Literature

PTL 1: JP2007-284926

SUMMARY OF INVENTION

Technical Problem

The present invention was made on the basis of the drawbacks of related art. An object of the invention is to provide a non-coated fabric for airbags and a coated fabric for airbags that are both less likely to have yarn slippage after being sewn, and that can be compactly stored, and airbags using these fabrics.

Solution to Problem

The present inventors conducted extensive research, and found that the following means can solve the problems. Then, they completed the present invention. Specifically, by determining the crimp ratio of a fabric for airbags in the warp direction, the present inventors have succeeded in providing a fabric for airbags that has increased edgecomb resistance in the warp direction even when the fabric has a high weaving density, that has decreased stiffness in the warp direction, that exhibits excellent yarn slippage resistance after being sewn and packageability when being used as an airbag, that has light weight, and that can be produced at low cost. Specifically, the present invention includes the following subject matter.

1. A non-coated fabric for airbags having a crimp ratio of 12% or more in the warp direction and a crimp ratio of 6% or less in the weft direction.
2. The non-coated fabric for airbags according to Item 1, having a stiffness of 100 mm or less in the warp yarn direction as determined based on two layers of the non-coated fabric by a cantilever method.
3. The non-coated fabric for airbags according to Item 1 or 2, having an edgecomb resistance of 1500 N or more in the warp yarn direction based on two layers of the non-coated fabric.
4. The non-coated fabric fox airbags according to any one of Items 1 to 3, comprising a synthetic-fiber multi filament that has a total fineness of 400 dtex or more and 600 dtex or less,
   the non-coated fabric for airbags having
      a weaving density of 56 yarn threads/2.54 cm or more in both the warp direction and the weft direction, and
      a cover factor of 2150 or more and 2600 or less.
5. An airbag comprising the non-coated fabric for airbags according to any one of Items 1 to 4.
6. A coated fabric for airbags having a crimp ratio of 12% or more in the warp direction and a crimp ratio of 6% or less in the weft direction.
7. The coated fabric for airbags according to Item 6, having a stiffness of 50 mm or less in the warp yarn direction as determined based on two layers of the coated fabric by a cantilever method.
6. The coated fabric for airbags according to Item 6 or 7, having an edge comb resistance of 1600 N or more ir the warp yarn direction based on two layers of the coated fabric.
9. The coated fabric for airbags according to any one of Items 6 to 8, comprising a synthetic-fiber multifilament that has a total fineness of 400 dtex or more and 600 dtex or less,
   the coated fabric having
      a weaving density of 56 yarn threads/2.54 cm or more in both the warp direction and the weft direction, and
      a cover factor of 2150 or more and 2600 or less.
10. The coated fabric for airbags according to any one of Items 6 to 9, wherein the amount of a silicone resin applied is 5 g/m$^2$ or more and 25 g/m$^2$ or less.

11. An airbag comprising the coated fabric for airbags according to any one of Items 6 to 10.

Advantageous Effects of Invention

The non-coated fabric for airbags and the coated fabric for airbags according to the present invention are less likely to nave yarn slippage after being sewn and used in airbags. Additionally, a non-coated fabric for airbags, a coated fabric for airbags, and airbags using these fabrics that, can be compactly stored in a module are provided.

DESCRIPTION OF EMBODIMENTS

The non-coated fabric for airbags according to the present invention has a crimp ratio of 12% or more, preferably 12.5% or more, and more preferably 13% or more in the warp direction. The non-coated fabric for airbags according to the present invention also has a crimp ratio of 6% or less, preferably 5.5% or leas, and more preferably 5% or less in the warp direction. Crimp ratios in the warp direction and in the weft direction within the numerical ranges above result, in edgecomb resistance that can sufficiently prevent yarn slippage after the fabric is sewn into airbag modules, and also lead to a non-coated fabric for airbags having a stiffness that enables the non-coated fabric for airbags to have increased packageability.

The crimp ratio in the present invention was measured in accordance with the method described in JIS L1096 (2010) 8.7.2B. The load applied was ⅒ g per dtex.

The non-coated fabric for airbags according to the present invention has a stiffness of preferably 100 mm or less based on two layers of the non-coated fabric in the warp direction as measured by the cantilever method. The stiffness of two layers of the fabric as determined by the cantilever method assumes the state of a fabric for airbags actually being used in an airbag. Although a lower stiffness is preferable, the stiffness is 80 ram or more in practice.

The stiffness of two layers of the fabric as measured by the cantilever method in the present invention was measured by overlaying one piece of the fabric on the other piece in the same direction, sewing one end with a sewing thread (upper thread: 1400 dtex, lower thread: 940 dtex, pitch: 2.2 mm), and performing measurement in accordance with JIS L1096 (2010) 8.19.1A (45° cantilever method). Specifically, measurement is performed as described below.

Ten test specimens (about 20 mm×about 150 ran) are cut out from a sample in the warp direction and in the weft direction each, and two test specimens are overlaid one on top on the other. One end is sewn with a sewing thread (1400 dtex, lower thread: 940 dtex, pitch: 2.2 mm). The five sewn test specimens in the warp direction and five test specimens in the weft direction are individually placed on a smooth horizontal table having a 45° slope at one end such that the short side of the test specimen is aligned with the scale baseline. Subsequently, the test, specimen is allowed to gently slide toward the slope by an appropriate method. When the center point of one end of the test specimen has come into contact with the slope, the position of the other end is read from the scale. The stiffness is indicated by the length (mm) over which the test specimen has moved. The front and back surfaces of each of the five specimens are measured for stiffness.

The non-coated fabric for airbags according to the present invention has an edgecomb resistance of preferably 1500 N or more, and more preferably 1550 N or more in the warp direction based on two layers of the fabric. The edgecomb resistance based on two layers of the fabric assumes the state of the fabric for airbags actually being used in an airbag. An edgecomb resistance of 1500 N or more can reduce not only the yarn slippage after the fabric is sewn, but also excessive loose weaves in the fabric during the deployment of an airbag, making it easier to avoid burst risk.

In the present invention, the edgecomb resistance based on two layers of the fabric is measured in accordance with ASTM D6479-15 with two layers of the fabric in the same direction. Specifically, a mark was made at a position of 5 mm from the edge of fabric samples in the same direction, and each fabric sample was accurately pierced with needles in the position. Two sheets of the fabric were placed one over the other and measured. The edgecomb resistance in the warp direction was determined by piercing the fabric with pins along weft yarn, and measuring the maximum load when the weft yarn was shifted with the pins in the warp yarn direction. The edgecomb resistance in the weft direction was determined by piercing the fabric with pins along the warp yarn, and measuring the maximum load when the warp yarn was shifted with the pins in the weft direction.

The non-coated fabric for airbags according to the present invention is a woven fabric formed from a synthetic-fiber multifilament. The synthetic-fiber multi filament (yarn removed from the fabric) that constitutes the non-coated fabric for airbags has a total fineness of preferably 400 dtex or more and 600 dtex or less, and more preferably 450 dtex or more and 550 dtex or less. A total fineness of 400 dtex or more, due to the elimination of the need for overly increasing the weaving density, reduces an excessive increase in binding force of the warp and weft, thus making it easier for the packageability in an airbag module to fall within an appropriate range. A total fineness of 600 dtex or less makes it easier to reduce an excessive increase in rigidity of the yarn threads that constitute the woven fabric. A synthetic-fiber multifilament having a total fineness within the range of 400 dtex or more and 600 dtex or less is preferable because such a synthetic-fiber multi filament, makes it easier to obtain a non-coated fabric for airbags that is moderately flexible and thus excellent, in packageability in a module.

In the present invention, the total fineness of synthetic-fiber multi filament (yarn removed from the fabric) that constitutes a fabric for airbags is determined as follows. The warp yarn threads and weft yarn threads of a fabric obtained through a dry-finishing step are each removed from the fabric, and measurement is performed in accordance with JIS L 1013 (2010) 8.3.1. Specifically, a sample with a length of 90 cm is accurately taken with an initial tension applied. The absolute dry mass is measured, and the fineness based on corrected weight (dtex) is calculated using the following formula. The average of five measurements is determined to be the total fineness.

$$F0 = 1000 \times m/0.9 \times (100+R0)/100$$

F0: Fineness based on corrected weight (dtex)
m: Absolute dry mass of sample (g)
R0: Official moisture content (%)

The non-coated fabric for airbags according to the present invention has a weaving density of preferably 56 yarn threads/2.54 cm or more, and more preferably 57 yarn threads/2.54 cm or more in both the warp yarn direction and the weft direction. When having a weaving density of 56 yarn threads/2.54 era or more, a non-coated fabric for airbags woven in the crimp ratio described above is unlikely to have gaps between fibers, and a substantial deterioration in edgecomb resistance can be easily reduced.

In the present invention, the weaving density is Measured in accordance with JIS L1096 (2010) 8.6.1. Specifically, a sample is placed on a flat table, and unnatural cringing and tension are removed. The number on warp yarn threads and weft yarn threads in a 2.54-cm section is counted at five different areas, and the average is calculated per unit length and determined to be a weaving density.

From the standpoint of light weight and high packageability, the non-coated fabric for airbags according to the present invention has a packageability of preferably 2300 cm$^3$ or less, and more preferably 2750 cm$^3$ or less in the packageability test prescribed in ASTM 06478-10 (2014). From the standpoint of light weight and high packageability, the lower limit of packageability is, although not particularly limited to, preferably 1900 cm$^5$ or more, and more preferably 2100 cm$^3$ or more based on a typically used non-coated fabric for airbags.

The packageability test in accordance with ASTM D6478-10 (2014) in the present invention is specifically performed as follows. A specimen with a width (weft yarn direction) of 750±5 mm and a length (warp yarn direction) of 300 mm±5 mm is taken from a sample, a plate with a width of 145 mm and a thickness of 2 mm is placed along the end portion in the warp yarn direction, and the sample is folded along the warp yarn threads. This operation is performed five times to fold the specimen into an accordion shape. The plate is removed, and the folded sample is rotated 90°. A plate with a width of 35 mm and a thickness of 2 mm is placed along the end portion in the weft yarn direction, and the woven fabric is then folded along the weft yarn threads. This operation is performed seven times to form the fabric into an accordion shape. The folded sample is placed in a storage box (inner dissension of bottom: 100 mm×150 am). The bulkiness (thickness) of the folded sample under a specific load is measured, and the packageability (cm$^3$) is then calculated using the following formula. The average of two measurements is determined to be the packageability.

$$[T20+T40+T60+\ldots T180]*100*150/1000 (cm^3)$$

(Tα: Bulkiness of the sample under a load of αN (mm); measurement is performed with α in 20 increments)

From the standpoint of Mechanical characteristics, the non-coated fabric for airbags according to the present invention has a tensile strength of preferably 700 N/cm or more, and more preferably 750 N/cm or more. The upper limit of tensile strength is, although not particularly limited to, preferably 1000 N/cm or less, and more preferably 900 N/cm or less, taking into account the relationship between the total fineness and tensile strength of the synthetic-fiber multifilament and the weaving density of the fabric for airbags.

In the present invention, the tensile strength of the fabric for airbags is measured in accordance with JIS L1096 (2010) 8.12.1. Specifically, a test is performed with a test, specimen captured by a tensile tester under initial tension at a tension rate of 200 m/min (width of the test specimen: 50 mm, length of the specimen between clamps: 200 mm) to measure the strength (N) at the time the fabric is torn apart. However, a case in which the specimen is torn apart within 10 mm from a clamp or abnormally torn apart is excluded.

The non-coated fabric: for airbags according to the present invention preferably has an elongation at maximum force of 23% or more. The elongation of the non-coated fabric for airbags differs between the warp yarn direction and the weft yarn direction. Thus, a non-coated fabric for airbags having an elongation at maximum force of 23% or more in both the warp yarn direction and the weft yarn direction makes it unlikely that stress concentrates on a portion that does not stretch much during the deployment of the airbag, maintaining a predetermined internal pressure during deployment. The non-coated fabric for airbags has an elongation at maximum force of more preferably 25% or more, and still more preferably 26% or more. Although a higher elongation at maximum force is preferable, the elongation at maximum force is preferably 401 or less, and more preferably 38% or less in practice.

In the present invention, the elongation at maximum force of a fabric for airbags is measured in accordance with JIS L1096 (2010) 8.12.1. Specifically, a test is performed with a test; specimen captured by a tensile tester under initial tension at a tension rate of 200 m/min (width of the test specimen: 50 mm, length of the specimen between clamps: 200 mm) to measure the elongation percentage (%) at the time the fabric is torn apart. However, a case in which the specimen is torn apart within 10 mm from a clamp or abnormally torn apart is excluded.

In the present invention, the non-coated fabric for airbags preferably has a cover factor (CF) of 2150 or more and 2600 or less, and more preferably 2200 or more and 2400 or less, taking into consideration the stiffness and edgecomb resistance defined in the present invention. The CF was measured using the following formula:

$$CF=(A\times0.9)^{1/2}\times(W1)+(B\times0.9)^{1/2}\times(W2)$$

wherein A and B indicate the thickness (dtex) of warp and weft, and W1 and W2 indicate a warp weaving density and a weft weaving density (yarn threads/2.54 cm).

The material of the synthetic-fiber multifilament that constitutes the non-coated fabric for airbags according to the present invention is not particularly limited, and can be selected from a wide range of materials. To meet the characteristics described above, while taking into economic efficiency account, the material is preferably a multifilament composed of a polyamide based-resin such as nylon C, nylon 66, and nylon 46, or a multifilament composed of a polyester based-resin that contains mainly polyethylene terephthalate. Of these, from the standpoint of heat capacity and flexibility, a multifilament composed of nylon 66 and/or nylon 46 is particularly preferable.

In the present specification, the "synthetic-fiber multifilament that constitutes the non-coated fabric for airbags according to the present invention" refers to a constituent thread, more specifically, a fiber obtained by fibrillating the non-coated fabric for airbags according to the present invention, and is distinguished from a synthetic-fiber multifilament that is original yarn for use in producing the non-coated fabric for airbags according to the present invention. Specifically, the constituent threads may have undergone a change in characteristics during the production process of the non-coated fabric for airbags compared with the original yarn. In this case, however, the constituent thread and the original yarn have other characteristics in common.

The synthetic-fiber multifilament that constitutes the non-coated fabric for airbags according to the present invention may contain various additives that are typically used for improving the productivity or characteristics in the production process for the original yarn or in the production process for the fabric. The synthetic-fiber multifilament that constitutes the non-coated fabric for airbags according to the present invention, for example, may contain at least one member selected from the group consisting of heat stabilizes, antioxidants, light stabilizers, lubricants, antistatic agents, plasticizers, thickening agents, pigments, and flame retardants.

The synthetic-fiber multifilament that constitutes the non-coated fabric for airbags according to the present invention preferably has a high tensile strength in terms of mechanical characteristics, specifically preferably 6.5 cN/dtex or more, more preferably 7.0 cN/dtex or more, and still more preferably 7.5 cN/dtex or more. There is no particular limitation to the upper limit of tensile strength; however, when nylon 66 fiber is used, the use of nylon 66 having a tensile strength of 3.5 cN/dtex can provide the effects of the present invention.

In the present invention, the tensile strength of the synthetic-fiber multifilament is measured in accordance with JIE L 1013 (2010) 8.5.1. Specifically, a sample is held loosely with the clamps of a tensile tester, and the load at the time the sample is torn apart is measured.

The synthetic-fiber multifilament that constitutes the non-coated fabric for airbags according to the present, invention preferably has an elongation at maximum force of 20% or more. The elongation of the non-coated fabric for airbags differs between the warp yarn direction and the weft yarn direction. A synthetic-fiber having an elongation at maximum force of 20% or more makes it unlikely that stress concentrates on a portion that does not stretch much during the deployment of the airbag, maintaining the internal pressure within a predetermined range during the deployment of the airbag. The multifilament has an elongation at maximum force of more preferably 23% or more, and still more preferably 25% or more. Although a relatively higher elongation at maximum force is preferable, the elongation at maximum force is preferably 35% or less, and more preferably 30% or less in practice.

In the present invention, the elongation at maximum force of the synthetic-fiber multifilament is measured in accordance with JIS L1013 (2010) 8.5.1. Specifically, a sample is held loosely with the clamps of a tensile tester, and the elongation at the time the sample is torn apart is measured.

The fineness of single filaments that constitute the synthetic-fiber multifilament that constitutes the non-coated fabric for airbags according to the present invention is not particularly limited. From the standpoint of ensuring packageability of an airbag as well as operability in spinning, the fineness is preferably 5.0 dtex or less. The fineness of single filaments is also preferably 2.0 dtex or more, and more preferably 2.4 dtex or more.

The aspect ratio of the cross-sectional shape of the single filaments that constitute the synthetic-fiber multifilament that constitutes the non-coated fabric for airbags according to the present invention is preferably 1.4 or less. Due to impacts such as tension during processing, the cross-sectional shape of a single filament of the constituent thread of the non-coated fabric for airbags may change into a shape different from the cross-sectional shape of a single filament of the original yarn. When the cross-sectional shape of a single filament of the constituent thread of the non-coated fabric for airbags has an aspect ratio of 1.4 or less, the cross-sectional surface of each yarn thread is regularly aligned in a predetermined direction at the time that the airbag is folded; this makes it easier to obtain a desired low air permeability.

The woven structure of the non-coated fabric for airbags according to the present invention includes plain weaves, twill weaves, satin weaves, and derivative weaves of these weaves; from the standpoint of excellent mechanical characteristics, plain weaves are preferable.

The original yarn for use in the production of the non-coated fabric for airbags according to the present invention may be a synthetic-fiber multifilament that can be obtained by ejecting a synthetic resin from a spinneret by using a typical melt-spinning method. The spinning conditions vary depending on the type of the synthetic resin (polymer) that serves as a starting material of the synthetic-fiber multifilament. Suitable conditions can be selected, for example, taking into account the viscosity and thermal characteristics of the polymer. Typically, in order to prevent the degradation of the polymer caused by heat, it is preferable to shorten the residence time of the polymer in a spinning machine, typically preferably within 10 minutes; a recommended residence time is mote preferably about 1 minute or more and about 5 minutes or less.

For example, when a fiber is produced using a polymer, such as polyethylene terephthalate or polyhexamethylene adipamide, as a starting material, it is preferable to provide immediately below the spinneret a heating cylinder (length: about 5 cm or more and about 50 cm or less) that is controlled so as to have a temperature of about 200° C. or more and about 350° C. or less and a relative humidity of about 85%, while keeping the spinning temperature at 280° C. or more and 310° C. or less; and to allow the polymer to pass through this heating cylinder. Allowing the polymer to pass through the heating cylinder delays the solidification of the molten polymer, enabling the resulting fiber to have high strength. The conditions such as the length, temperature, and relative humidity of the heating cylinder can ire optimized, for example, by the fineness of the single filaments that constitute the obtained fiber and the number of single filaments. Additionally, it is also effective to optionally seal the atmosphere inside the heating cylinder with a high-temperature inert gas in order to reduce thermal degradation caused by keeping the inside of the heating cylinder at a high temperature.

Subsequently, as described above, after passing through the high-temperature atmosphere, the span yarn threads are solidified by cooling with cold air. An oil agent is then added to the yarn threads, and the yarn threads are taken up by a take-up roll that controls the spinning speed. The non-stretched yarn threads that have been taken up by the tare-up roll are typically continuously drawn. However, after having been spooled, such non-stretched yarn threads may be drawn in another step. Spinning is typically performed at a spinning speed of 2000 m/min or less, and drawing for use may be ordinarily used hot stretching. Drawing is preferably multiple-step drawing that involves two or more steps. Although the draw ratio varies depending on, for example, the birefringence of non-stretched yarn threads, drawing temperature, and the stretch ratio distribution at the multi-step drawing, the draw ratio is preferably 1.5 times or more and 6.0 times or less, and more preferably 2.0 times or more and 5.5 times or less.

Subsequently, the drawn fibers can be subjected to heat fixation in accordance with an ordinary method. When heat fixation is performed, the tension and/or temperature in heat fixation may be changed.

In the drawing step or in the hear, fixation step, running yarn threads may be entangled. Entangling can be performed by a known method, such as air entangling. In air entangling, a suitable degree of entangling can be achieved by, for example, changing the air pressure in accordance with the fineness and/or tension of yarn threads for use.

The synthetic-fiber multifilament as original yarn for use in the production of the non-coated fabric for airbags according to the present invention preferably has a higher tensile strength from the standpoint of mechanical characteristics. The synthetic-fiber multifilament preferably has a tensile strength of 7.0 cN/dtex or more, more preferably 7.5 cN/dtex or more, and still more preferably 8.0 cN/dtex or more. The upper limit of tensile strength is not particularly limited; however, when nylon 66 fiber is used, the upper limit is preferably 9.0 cN/dtex or less from the standpoint of original yarn production.

The synthetic-fiber multifilament as original yarn fox use in the production of the non-coated fabric for airbags according to the present invention preferably has an elongation at maximum force of 15% or more, more preferably 18%, and still more preferably 20% or more. A synthetic-fiber multifilament having an elongation at maximum force of 15% or more makes it unlikely to occur for the woven fabric that stress concentrates on a portion that does not stretch much during the deployment of the airbag/maintaining a predetermined internal pressure during deployment. Although a relatively higher elongation at maximum force is preferable, the elongation at maximum force is preferably 30% or less, and more preferably 25% or less front the standpoint of original yarn production.

In the present invention, the tensile strength and elongation at maximum force of the original yarn are measured in accordance with JIS L1013 (2010) 8.5.1. Specifically, a sample is held loosely with the clamps of a tensile tester, and the load and elongation at the time the sample is torn apart are measured.

The synthetic-fiber multifilament as original yarn for use in the production of the non-coated fabric for airbags according to the present invention preferably has a boiling-water shrinkage rate of or more, and more preferably 8% or more from the standpoint of reducing air permeability. An overly high boiling-water shrinkage rate may result in increased thickness of the non-coated fabric for airbags after shrinkage processing. Thus, from the standpoint of packageability in a module, the synthetic-fiber multifilament as original yarn preferably has a boiling-water shrinkage rate of 15% or less, and more preferably 12% or less. A boiling-water shrinkage rate within these numerical ranges enables the production of a non-coated fabric for airbags with low air permeability and excellent packageability in a module by performing shrinkage treatment described later.

In the present invention, the boiling-water shrinkage rate or the original yarn is measured in accordance with the boiling-water shrinkage rate method B prescribed in JIS L 1013 (2010). Specifically, the boiling-water shrinkage rate is measured as follows. An initial tension is applied to a sample, and two points 500 mm apart are marked. The initial tension is then removed, and the sample is immersed in hot water at 100° C. for 30 minutes. The sample is then taken out and gently wiped out of water with blotting paper or a cloth. The sample is air-dried, and then initial tension is applied again. The length between the two points is measured, and the dimensional change rate by boiling water (%) is calculated using the following formula. The average of three measurements is determined to be the boiling-water shrinkage rate.

$$\Delta L = (L-500)/500 \times 100$$

$\Delta L$: Boiling-water shrinkage rate (%); L: length between two points (mm)

The synthetic-fiber multifilament that constitutes the non-coated fabric for airbags according to the present invention is preferably substantially untwisted yarn or loosely twisted yarn, and more preferably untwisted yarn, k synthetic-fiber multifilament that is substantially untwisted yarn or loosely twisted yarn ensures that the spread of single filaments that constitute the synthetic fiber is not hampered, lowering the air permeability of the non-coated fabric for airbags.

From the standpoint of the ease of spinning technique and quality, the cross-sectional surface of a single filament that constitute the original yarn for use in the production of the non-coated fabric for airbags according to the present invention is preferably a round cross-sectional surface. The "round cross-sectional surface" as used here refers to a cross-sectional shape that has an aspect ratio (cross-sectional surface of fiber:major axis/minor axis) of 1.1 or less. Criminal yarn whose single filaments have a round cross-sectional surface is easier to spin, and is more unlikely to generate original yarn fluff when drawing is performed to increase synthetic fiber strength, compared with original yarn composed of single filaments that have an irregular cross-sectional surface such as flat cross-sectional surface or square cross-sectional surface.

The non-coated fabric for airbags according to the present invention can be obtained by weaving the original yarn described above.

A woven fabric of the synthetic-fiber multifilament described above can be woven using the synthetic-fiber multifilament in both the warp and weft as is by using a commonly used method. When doing this, it is preferable neither to perform yarn twisting nor to apply glue. Eliminating these steps makes it easier, for single filaments in the warp and weft that constitute the woven fabric to spread, achieving low air permeability.

The loom for use in the production process of the non-coated fabric for airbags according to the present invention is not particularly limited. Examples of usable looms include water-jet looms, air-jet looms, rapier looms, and projectile looms. Taking into consideration, for example, weaving productivity, reduction in damage to the original yarn threads, and no requirement for starch in warp, a water-jet loom and an air-jet loom are particularly suitable. Additionally, from the standpoint of the ease of removing the original yarn oil agent and warping oil agent during the processing, a water-jet loom, which is capable of removing these agents almost completely with water during fabric weaving, is most preferable because the scouring step can be simplified.

The warp tension when the non-coated fabric for airbags according to the present invention is woven is preferably 50 cN/thread or more and 200 cN/tread or less. A warp tension of 50 cN/tread or more makes it unlikely for the warp to become loose do ring the weaving process, avoiding flaw's of fabric or shot-down of the loom. A warp tension of 200 cN/tread or less makes if easier for an excessive load to be applied onto the warp, avoiding flaws of fabric.

When weaving the non-coated fabric for airbags according to the present invention, it is preferable to set the dwell angle of the reed to 60° or more and 120° or less in order to improve the cramp ration in the warp direction and to reduce fabric flaws. A dwell angle of the reed outside this range may not ensure the running region of the warp, possibly leading to many fabric flaws.

When weaving the non-coated fabric for airbags according to the present invention, it is preferable to attach a guide roll between the back roll and the heddle so as to lift the warp 20 mm or more and 50 mm or less from the warp line in order to improve the crimp ratio in the warp direction and to reduce fabric flaws. A warp line positioning outside this range may lead to many fabric flaws due to the difference in tension between the upper thread and the lower thread.

When weaving the non-coated fabric for airbags according to the present invention, it is preferable to attach a positive easing mechanism to the back roll in order to improve the crimp ratio in the warp direction and to maintain fabric strength. The degree of easing in the positive easing mechanism is preferably 5 mm or more and 7.5 mm or less, and easing timing is preferably cross timing of the loom ±30°. The use of the positive easing mechanism within this setting range enables the prevention of excessive tension applied to the warp during shedding motion, and prevents excessive load from being applied onto threads, maintaining fabric strength. It is also possible to shed warp under appropriate tension; thus, the crimp ratio in the warp direction can be improved.

When weaving the non-coated fabric for airbags according to the present invention, it is preferable to adjust the pump diameter, the stroke, and the nozzle diameter in the direction in which the yarn feeding power is increased in order to improve the crimp ratio in the warp direction.

Subsequently, the obtained woven fabric is subjected to shrinkage processing, and then dried, thereby obtaining the non-coated fabric for airbags according to the present invention.

Examples of shrinkage processing include heat setting processes, such as hot-water processing and pin center; hot-water processing using hot water in the shrinkage processing is preferable. A usable method using hot water includes a method of indorsing a woven fabric obtained by the weaving process described above in hot water and a method of spraying a woven fabric with hot water. The temperature of not water is preferably about 30° C. or more and about 100° C. or less, and more preferably 95° C. or more. The woven fabric obtained by weaving may be subjected to shrinkage processing after being dried. However, from the standpoint of production costs, it is advantageous that the woven fabric obtained by weaving is subjected to shrinkage processing without drying, and then to dry finish.

The heating temperature in drying treatment in the production process for the non-coated fabric for airbags according to the present invention is, although not particularly limited to, typically 80° C. or more and 200° C. or less, and preferably 160° or less. After drying, calendaring processing, resin processing, or coating processing may optionally be performed, as long as the effects of the present invention are not impaired.

The coated fabric for airbags according to the present invention has a crimp ratio of 12% or more, preferably 12.5% or more, and more preferably 13% or more in the warp direction. The coated fabric for airbags according to the present invention also has a crimp ratio of 6% or less, preferably 5.5% or less, and more preferably 5% or less in the weft direction. Crimp ratios in the warp direction and in the weft direction within the numerical ranges above result in edgecomb resistance that can sufficiently prevent yarn slippage after the fabric is sewn into airbag modules, and also lead to a coated fabric for airbags having a stiffness that enables the coated fabric for airbags to have increased packageability.

The coated fabric for airbags according to the present invention has a stiffness of preferably 90 mm or less based on two layers of the coated fabric in the warp direction as measured by the cantilever method. The stiffness of two layers of the fabric as determined by the cantilever method assumes the state of a fabric for airbags actually being used in an airbag. Although a lower stiffness is preferable, the stiffness is 70 mm or more in practice.

The coated fabric: for airbags according to the present invention has an edgecomb resistance of preferably 1600 N or more, and more preferably 1650 N or more in the warp direction based on two layers of the fabric. The edgecomb resistance based on two layers of the fabric assumes the state of the coated fabric for airbags actually being used in an airbag. An edgecomb resistance of 1600 or more can reduce not only the yarn slippage after the fabric is sewn, but also excessive loose weaves in the coated fabric for airbags during the deployment of the airbag, making it easier to avoid burst risk.

The coated fabric for airbags according to the present invention is a woven fabric formed from a synthetic-fiber multi filament. The synthetic-fiber multifilament (yarn removed from the fabric) that constitutes the coated fabric for airbags has a total fineness of preferably 400 dtex or more and 600 dtex or less, more preferably 450 dtex or more and 550 dtex or less. A total fineness of 400 dtex or more, due to the elimination of the need for overly increasing the weaving density, reduces an excessive increase in binding force of the warp and were, thus making it easier for the packageability in an airbag module to fall within an appropriate range. A total fineness of 600 dtex or less makes it easier to reduce an excessive increase in rigidity of the yarn threads that constitute the woven fabric. A synthetic-fiber multifilament having a total fineness within the range of 400 dtex or more and 600 dtex or less is preferable because such a synthetic-fiber multifilament makes it easier to obtain a coated fabric for airbags that is moderately flexible and thus excellent in packageability in a module.

The coated fabric for airbags according to the present invention has a weaving density or preferably 56 yarn threads/2.54 cm or more, and more preferably 57 yarn threads/2.54 cm or more in both the warp yarn direction and the weft direction. When having a weaving density of 56 yarn threads/2.54 cm or more, a coated fabric for airbags woven in the crimp ratio described above is unlikely to have gaps between fibers, and a substantial deterioration in edgecomb resistance can be easily reduced.

From the standpoint of light weight and high packageability, the coated fabric for airbags according to the present invention has a packageability of preferably 3100 cm$^3$ or less, and more preferably 3000 cm$^3$ or less in the packageability test prescribed in ASTM D6478-10 (2014). From the standpoint of light, weight and high packageability, the lower limit of packageability is, although not particularly limited to, preferably 1500 cm$^3$ or more, and more preferably 2100 cm$^3$ or more based on a typically used coated fabric for airbags.

From the standpoint of mechanical characteristics, the coated fabric for airbags according to the present invention has a tensile strength of preferably 700 N/cm or more, and more preferably 750 N/cm or more. The upper limit of tensile strength is, although not particularly limited to, preferably 1000 N/cm or less, and more preferably 900 N/cm or less, taking into account the relationship between the total fineness and tensile strength of the synthetic-fiber multifilament and the weaving density of the coated fabric for airbags.

The coated fabric for airbags according to the present invention preferably has an elongation at maximum force of 23% or more. The elongation of the coated fabric for airbags differs between the warp yarn direction and the weft yarn direction. Thus, a coated fabric for airbags having an elongation at maximum force of 23% or more in both the warp yarn direction and the weft yarn direction makes it unlikely that stress concentrates on a portion that does not stretch much during the deployment of the airbag, maintaining a predetermined internal pressure during deployment. The coated fabric for airbags has an elongation at maximum force of more preferably 25% or more, and still more preferably 26% or more. Although a higher elongation at maximum force is preferable, the elongation at maximum force is preferably 40% or less, and more preferably 38% or less in practice.

In the present invention, the coated fabric for airbags preferably has a cover factor (CF) of 2150 or more and 2600 or less, and more preferably 2200 or more and 2400 or less, taking into consideration the stiffness and edgecomb resistance defined in the present invention. The CF was measured using the following formula:

$$CF=(A\times 0.9)^{1/2}\times(W1)+(B\times 0.9)^{1/2}\times(W2)$$

wherein A and B indicate the thickness (dtex) of warp and weft, and W1 and W2 indicate a warp weaving density and a weft weaving density (yarn threads/2.54 cm).

The material of the synthetic-fiber multifilament that constitutes the coated fabric for airbags according to the present invention is not particularly limited, and can be selected from a wide range of materials. To meet the characteristics described above, while taking economic efficiency into account, the material is preferably a multi filament, composed of a polyamide based-resin such as nylon 6, nylon 66, and nylon 46, or a multifilament composed of a polyester based-resin that contains mainly polyethylene terephthalate. Of these, from the standpoint of heat capacity and flexibility, a multifilament composed of nylon 66 and/or nylon 46 is particularly preferable.

In the present specification, the "synthetic-fiber multifilament that constitutes the coated fabric for airbags according to the present invention" refers to a constituent thread, more specifically, a fiber obtained by fibrillating the coated fabric for airbags according to the present invention, and is distinguished from a synthetic-fiber multifilament that is original yarn for use in producing the coated fabric for airbags according to the present invention. Specifically, the constituent thread may have undergone a change in characteristics during the production process of the coated fabric for airbags compared with the original yarn. In this case, however, the constituent thread and the original yarn have other characteristics in common.

The synthetic-fiber multi filament that constitutes the coated fabric for airbags according to the present invention may contain various additives that are typically used for improving the productivity or characteristics in the production process for the original yarn or in the production process for the fabric. The synthetic-fiber multifilament that constitutes the coated fabric for airbags according to the present invention, for example, may contain at least one member selected from the group consisting of heat stabilizes, antioxidants, light stabilizers, lubricants, antistatic agents, plasticizers, thickening agents, pigments, and flame retardants.

The synthetic-fiber multifilament that constitutes the coated fabric for airbags according to the present invention preferably has a high tensile strength in terms of mechanical characteristics, specifically preferably 6.5 cN/dtex or more, more preferably 7.0 cN/dtex or more, and still more preferably 7.5 cN/dtex or more. There is no particular limitation to the upper limit of tensile strength; however, when nylon 66 fiber is used, the use of nylon 66 having a tensile strength of 9.5 cN/dtex can provide the effects of the present invention.

The synthetic-fiber multifilament that constitutes the coated fabric for airbags according to the present invention preferably has an elongation at maximum force of 20% or more. The elongation of the coated fabric for airbags differs between the warp yarn direction and the weft yarn direction. A synthetic-fiber multifilament having an elongation at maximum force of 20% or more makes it unlikely that stress concentrates on a portion that does not stretch much during the deployment of the airbag, maintaining the internal pressure within a predetermined range during the deployment of the airbag. The synthetic-fiber multifilament has an elongation at maximum force of more preferably 23% or more, and still more preferably 25% or more. Although a relatively higher, elongation at maximum force is preferable, the elongation at maximum force is preferably 35% or less, and more preferably 30% or less in practice.

The fineness of single filaments that, constitute the synthetic-fiber multifilament that constitutes the coated fabric for airbags according to the present invention is not particularly limited. From the standpoint of ensuring packageability of an airbag as well as operability in spinning, the fineness is preferably 5.0 dtex or less. The fineness of the single filament is also preferably 2.0 dtex or more, and more preferably 2.4 dtex or more.

The aspect ratio of the cross-sectional shape of the single filament that constitutes the synthetic-fiber multifilament that constitutes the coated fabric for airbags according to the present invention is preferably 1.4 or less. Due to impacts such as tension during processing, the cross-sectional shape of a single filament of the constituent thread of the coated fabric for airbags may change into a shape different from the cross-sectional shape of a single filament of the original yarn. When the cross-sectional shape of a single filament of the constituent thread of the coated fabric for airbags has an aspect ratio of 1.4 or less, the cross-sectional surface of each yarn thread is regularly aligned in a predetermined direction at the time that the airbag is folded; this makes it easier to obtain a desired low air permeability.

The woven structure of the coated fabric for airbags according to the present invention includes plain weaves, twill weaves, satin weaves, and derivative weaves of these weaves; from the standpoint of excellent mechanical characteristics, plain weaves are preferable.

The original yarn for use in the production of the coated fabric for airbags according to the present invention may be a synthetic-fiber multi filament that can be obtained by ejecting a synthetic resin from a spinneret by using a typical, melt-spinning method. The spinning conditions vary depending on the type of the synthetic resin (polymer) that serves as a starting material of the synthetic-fiber multifilament. Suitable conditions can be selected, for example, taking into account the viscosity and thermal characteristics of the polymer. Typically, in order to prevent the degradation of the polymer caused by heat, it is preferable to shorten the residence time of the polymer in a spinning machine, typically preferably within 10 minutes; a recommended residence time is more preferably about 1 minute or more and about 5 minutes or less.

For example, when a fiber is produced using a polymer, such as polyethylene terephthalate or polyhexamethylene adipamide, as a starting material, it is preferable to provide immediately below the spinneret a heating cylinder (length: about 5 cm or more and about –0 cm or less) that is controlled so as to have a temperature of about 200° C. or more and about 350° C. or less and a relative humidity of about 85%, while keeping the spinning temperature at 280° C. or more and 310° C. or less; and to allow the polymer to pass through this heating cylinder. Allowing the polymer to pass through the heating cylinder delays the solidification of the molten polymer, enabling the resulting fiber to have high strength. The conditions such as the length, temperature, and relative humidity of the heating cylinder can be optimised, for example, by the fineness of the single filaments that constitute the obtained fiber and the number of single filaments. Additionally, it is also effective to optionally seal the atmosphere inside the heating cylinder with a high-temperature inert gas in order to reduce thermal degradation caused by keeping the inside of the heating cylinder at a high temperature.

Subsequently, as described above, after passing through the high-temperature atmosphere, the span yarn threads are solidified by cooling with cold air. An oil agent is then added to the yarn threads, and the yarn threads are taken up by a take-up roll that controls the spinning speed. The non-stretched yarn threads that have been taken up by the fate-up roll are typically continuously drawn. However, after having been spooled, such non-stretched yarn threads may foe drawn in another step. Spinning is typically performed at a spinning speed ox 2000 m/min or less, and drawing for use may be ordinarily used hot stretching. Drawing is preferably multiple-step drawing that involves two or more steps. Although the draw ratio varies depending on, for example, the birefringence of non-stretched yarns, drawing temperature and the stretch ratio distribution at the multi-step drawing, the draw ratio is preferably 1.5 times or more and 6.0 times or less and more preferably 2.0 times or more and 5.5 times or less.

Subsequently the drawn fibers can be subjected to heat fixation in accordance with an ordinary method. When heat fixation is performed the tension and/or temperature in heat, fixation may foe changed.

In the drawing step or in the heat fixation step running yarn threads may be entangled. Entangling can be performed by a known method such as air entangling. In air entangling a suitable degree of entangling can be achieved by, for example changing the air pressure in accordance with the fineness and/or tension of yarn threads for use.

The synthetic-fiber multifilament as original yarn for use in the production of the coated fabric for airbags according to the present invention preferably has a higher tensile strength from the stand point of mechanical characteristics. The synthetic-fiber multifilament preferably has a tensile strength of 7.0 cN/dtex or more, more preferably 7.5 cN/dtex or more, and still more preferably 3.0 cN/dtex or more. The upper limit of tensile strength is not particularly limited; however when nylon 66 fiber is used the upper limit is preferably 9.0 cN/dtex or less from the standpoint of original yarn production.

The synthetic-fiber multifilament as original yarn fox use in the production of the coated fabric for airbags according to the present invention preferably has an elongation at maximum force of 15% or more, more preferably 18%, and still more preferably 20% or more. A synthetic-fiber multi filament having an elongation at maximum force of 15% or more makes it unlikely to occur for the woven fabric that stress concentrates on a portion that does not stretch much during the deployment of the airbag, maintaining a predetermined internal pressure during deployment. Although a relatively higher elongation at maximum force is preferable, the elongation at maximum force is preferably 30% or less, and more preferably 25% or less from the standpoint of original yarn production.

The synthetic-fiber multifilament as original yarn for use in the production of the coated fabric for airbags according to the present invention preferably has a boiling-water shrinkage rate of 5% or more, and more preferably 8% or more from the standpoint of reducing air permeability. An overly high boiling-water shrinkage rate may result in increased thickness of the coated fabric for airbags after shrinkage processing. Thus, from the standpoint of packageability in a module, the synthetic-fiber multifilament as original yarn preferably has a boiling-water shrinkage rate of 15% or less, and more preferably 12% or less. A boiling-water shrinkage rate within these numerical ranges enables the production of a coated fabric for airbags with low air permeability and excellent packageability in a module by performing shrinkage treatment described later.

The synthetic-fiber multifilament that constitutes the coated fabric for airbags according to the present invention is preferably substantially untwisted yarn or loosely twisted yarn, and more preferably untwisted yarn. A synthetic-fiber multifilament that is substantially untwisted yarn or loosely twisted yarn ensures that the spread of single filaments that constitute the synthetic-fiber multi filament is not hampered, lowering the air permeability of the coated fabric for airbags.

From the standpoint of the ease of spinning technique and quality, the cross-sectional surface of single filaments that constitute the original yarn for use in the production of the coated fabric for airbags according to the present invention is preferably a round cross-sectional surface. The "round cross-sectional surface" as used here refers to a cross-sectional shape that has an aspect ratio (cross-sectional surface of fiber:major axis/minor axis) of 1.1 or less. Original yarn whose single filaments have a round cross-sectional surface is easier to spin and is more unlikely to generate original yarn fluff when drawing is performed to increase synthetic fiber strength, compared with original yarn composed of single filaments that have an irregular cross-sectional surface such as flat cross-sectional surface or square cross-sectional surface.

A woven fabric (base fabric) for use in the coated fabric for airbags according to the present invention can be obtained by weaving the original yarn described above.

A woven fabric of the synthetic-fiber multi filament described above can be woven using the synthetic-fiber multifilament in both the warp and weft as is by using a commonly used method. When doing this, it is preferable neither to perform yarn twisting nor to apply glue. Eliminating these steps makes it easier for single filaments in the warp and weft that constitute the woven fabric to spread, achieving low air permeability.

The loom for use in the production process of a woven fabric for use in the coated fabric for airbags according to the present invention is not particularly limited. Examples of usable looms include wafer-jet looms, air-jet looms, rapier looms, and projectile looms. Taking into consideration, for example, weave productivity, reduction in damage to the original yarn, and no requirement for starch in warp, a water-jet loom and an air-jet loom are particularly suitable. Additionally, from the standpoint of the ease of removing the original yarn oil agent and warping oil agent during the processing, a water-jet loom, which is capable of removing these agents almost completely with water during fabric weaving, is most preferable because the scouring step can be simplified.

The warp tension when a woven fabric for use in the coated fabric for airbags according to the present invention is woven is preferably 50 cN/thread or more and 200 cN/thread or less. A warp tension of 50 cN/thread or more makes it unlikely for the warp to become loose during the weaving process, avoiding flaws of fabric or shut-down of the loom. A warp tension of 200 cN/thread or less makes it easier for an excessive load to be applied onto the warp, avoiding flaws of fabric.

When weaving a woven fabric for use in the coated fabric for airbags according to the present Invention, it is preferable to set the dwell angle of the reed to 60° C. or more and 120° C. or less in order to improve the cramp ration in the warp direction and to reduce fabric flaws. A dwell angle of the reed outside this range may not ensure the running region of the warp, possibly leading to many fabric flaws.

When weaving a woven fabric for use in the coated fabric for airbags according to the present invention, it is preferable to attach a guide roll between the back roll and the heddle so as to lift the warp 20 mm or more and 50 mm or less from the warp line in order to improve the crimp ratio in the warp direction and to reduce fabric flaws. A warp line positioning outside this range may lead to many fabric flaws due to the difference in tension between the upper thread and the lower thread.

When weaving a woven fabric for use in the coated fabric for airbags according to the present invention, it is preferable to attach a positive easing mechanism to the back roll in order to improve the crimp ratio in the warp direction and to maintain fabric strength. The degree of easing in the positive easing mechanism is preferably 5 mm or more and 7.5 mm or less, and easing timing is preferably cross timing of the loom ±30° C. The use of the positive easing mechanism within this setting range enables the prevention of excessive tension applied to the warp during shedding motion, and prevents excessive load from being applied onto yarn threads, maintaining fabric strength. It is also possible to shed warp under appropriate tension; thus the crimp ratio in the warp direction can be improved.

When weaving a woven fabric for use in the coated fabric for airbags according to the present invention, it is preferable to adjust the pump diameter, the stroke, and the nozzle diameter in the direction in which the yarn feeding power is increased in order to improve the crimp ratio in the warp direction.

Subsequently, the obtained woven fabric is subjected to shrinkage processing, and then dried, thereby obtaining a woven fabric for use in the coated fabric for airbags according to the present invention.

Examples of shrinkage processing include heat setting processes, such as hot-water processing and pin tenter; hot-water processing using hot water in the shrinkage processing is preferable. A usable method using hot water includes a method of immersing a woven fabric obtained by the weaving process described above in hot water and a method of spraying a woven fabric with hot water. The temperature of hot water is preferably about 80° C. or more and about 100° C. or less, and more preferably 35° C. or more. The woven fabric obtained by weaving may be subjected to shrinkage processing after being dried. However, from the standpoint of production costs, it is advantageous that the woven fabric obtained by weaving is subjected to shrinkage processing without drying, and then to dry finish.

The heating temperature in drying treatment in the production process for a woven fabric for use in the coated fabric for airbags according to the present invention is, although not particularly limited to, typically 80° C. or more and 200° C. or less, and preferably 160° C. or less.

It is a preferable embodiment to use the non-coated fabric for airbags according to the present invention as a woven fabric for use in the coated fabric for airbags according to the present invention (i.e., base fabric).

The coating resin for use in the coating step of the production process for the coated fabric for airbags according to the present invention is preferably an elastomer resin that has heat resistance, cold resistance, and flame retardancy; a most effective coating resin is a silicone based-resin. Specific examples of silicone based-resins include addition-polymerization silicone rubber. Examples include dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, and polyester-modified silicone resin. Of these, methyl vinyl silicone rubber is suitable because this rubber has rubber elasticity after being cured, has excellent strength and elongation, and is cost advantageous.

In the present invention, the resin viscosity of the silicone resin for use is very important. The silicone resin preferably has a viscosity of 15 Pa·sec or less, and more preferably 12 Pa·sec or less. A resin viscosity of more than 15 Pa sec makes it unable for the resin to be present in the woven-mesh portion of the warp and weft on the non-coated surface/although the presence of resin in the woven-mesh portion is essential for increasing the tensile strength of a coated fabric. The lower limit is, although not particularly limited to, preferably 5 Pa·sec or more. The resin may be either a solvent-based resin or a solventless resin as long as the viscosity can be adjusted so as to fail within these numerical ranges. Taking environmental impact into consideration, a solventless resin is preferable.

In the present invention, the viscosity of a resin composition containing additives in addition to a resin is also defined as "resin viscosity."

The resin preferably has a film strength of 5 MPa or more, and a film elongation of 150% or less. Typically, the film, strength and film elongation give a value of linked physical properties. In particular, when a silicone resin is present in the spacing between adjacent yarns of the warp and weft on the non-coated surface, a film elongation of 150% or less reduces the degree of freedom of yarn threads generated by the elongation of the silicone resin, and holds the yarn threads, leading to entire rupture of the yarn threads at one time; this enables the fabric to have a high tensile strength. The film elongation is more preferably within the range of 120% or less. The upper limit, of film strength is, although not particularly limited to, preferably 20 MPa or less. From the standpoint of coated fabric flexibility, the film elongation is preferably 50% or more.

A sample for measuring the film strength and film elongation of a silicone resin is prepared under the same conditions as those for actually coating a woven fabric for airbags (base fabric) and forming a film (temperature, time, and pressure). Specifically, a resin film with a constant thickness of 0.5 mm is prepared from a silicone resin, and subjected to cure treatment at 190° C. for 2 minutes by a hot-air irradiation method, followed by performing a tensile test.

The hardness of the resin is measured in accordance with ASTM D2240. The hardness measured with a Shore A durometer is preferably 40 or more, and more preferably 47 or more. A hardness ox 40 or more restricts the motion of yarn threads caused by deformation of the resin during a tensile test, and holds the yarn threads, leading to entire rupture of the yarn threads at one time, as with the elongation of the resin; this enables the fabric to have a high tensile strength. The upper limit is, although not particularly limited to, typically 70 or less.

An alkenyl group-containing polysiloxane, which is a component serving as a base resin that constitutes the coating layer of the coated fabric for airbags according to the present invention, contains two or more alkenyl groups bound to a silicon atom per molecule so that after being cured, the resin becomes a silicone resin film that has rubber elasticity. The position of the silicon atom to which an alkenyl group is bound in the alkenyl group-containing polysiloxane skeleton is, for example, ends of the molecular chain and/or in the middle of the molecular chain (not the ends of the molecular chain); however, the molecular chain is preferably a linear chain that contains alkenyl groups whose silicon atom is bound to both a silicon atom at ends of the molecular chain and a silicon atom in the middle of the molecular chain.

The alkenyl group-containing polysiloxane component preferably has a viscosity at 25° C. of 10,000 Pa·sec or more and 30,000 mPa·sec or less, and particularly preferably 13,000 Pa·sec or more and 27,000 mPa·sec or less, from the standpoint of physical characteristics such as adhesiveness of the cured product to fibers, rubber strength, and blocking resistance and workability.

Organohydrogenpolysiloxane that constitutes the silicone resin undergoes hydrosilylation addition reaction with the alkenyl group-containing polysiloxane, and acts as a cross-linking agent. The molecular structure of the organohydrogenpolysiloxane may be, for example, linear, cyclic, or branched, or a three-dimensional network.

The organohydrogenpolysiloxane contains, par molecule, hydrogen atoms bound to at least two (typically, about two or more and about 300 or less) silicon atoms. When the organohydrogenpolysiloxane has a linear structure, the hydrogen atoms bound to these silicon atoms may be positioned either at the ends of the molecular chain or in the middle of the molecular chain (i.e., not the ends of the molecular chain), or at both.

Organohydrogenpolysiloxane preferably has a viscosity at 25° C. of 0.1 Pa·sec or more and 1,000 mPa·sec or less, and particularly preferably 0.1 Pa·sec or more and 500 mPa·sec or less.

Organohydrogenpolysiloxane is added in such an amount that the number of hydrogen atoms bound to the silicon atoms in component (B) per alkenyl group bound to a silicon atom in component (A) is typically 1 or more and 20 or less, more preferably 1 or more and 30 or less, and particularly preferably 1 or more and 5 or less.

The film strength and film elongation of the resin can be adjusted by the molecular weight of alkenyl group-containing polysiloxane and the structure and the amount of organohydrogenpolysiloxane.

When a silicon resin is used, a reactive curing agent may also lie used. Typical examples include a platinum or platinum compound catalyst (platinum-based catalyst). A known reactive curing agent is usable, and specific examples include platinum black, chloroplatinic acid, alcohol-modified products of chloroplatinic acid, and complexes of chloroplatinic acid with, for example, olefin, aldehyde, vinyl siloxane, or acetylene alcohol. The more a platinum compound catalyst is added, the more hydrosilylation is facilitated. However, a platinum compound catalyst is typically added in an amount of 100 ppm or more and 2000 ppm or less on a platinum metal basis to a composition.

To improve adhesiveness of the silicone resin to the woven fabric for airbags (base fabric), the silicone resin preferably contains an adhesive aid. The adhesive aid is, for example, at least one member selected from the group consisting of amino-based silane coupling agents, epoxy-modified silane coupling agents, vinyl-based silane coupling agents, chloro-based silane coupling agent, and mercapto-based silane coupling agents, but not limited to these silane coupling agents.

Additionally, the silicone resin may contain, for example, a reinforcing inorganic filler such as fumed silica and dry silica, a crosslinkable silicone having the terminal groups adjusted (silicone resin), and a non-reinforcing inorganic filler such as calcium carbonate, calcium silicate, and titanium dioxide. The amount of these inorganic fillers is 0.1 parts by mass or more and 200 parts by mass or less, and more preferably 0.1 parts by mass or more and 100 parts by mass or less based on the alkenyl group-containing polysiloxane component.

Additionally, the silicone resin may contain an inorganic pigment and/or an, organic pigment as a colorant. Examples of inorganic pigments include carbon black, titanic oxide, red colcothar, black colcothar, titanium yellow, and cobalt blue. Examples of organic pigments include condensed azo-based pigments (yellow, brown, red), isoindolinone-based pigments (yellow, orange), quinacridone-based pigments (red, purple), diketopyrrolopyrrole-based pigments (orange, red, purple), anthraquinone-based pigments (yellow, red, blue), dioxazine-based pigments (purple), benzimidazolene-based pigments (orange), copper phthalocyanine-based pigments (blue), and allyl amide-based pigments (yellow).

The amount of the coating resin applied for the coated fabric for airbags according to the present invention is preferably 5 $g/m^2$ or more and 25 $g/m^2$ or less, and more preferably 10 $g/m^2$ or more and 23 $g/m^2$ or less. A resin amount of less than 5 $g/m^2$ may result in a low thickness of the resin layer on the surface of the woven fabric, leading to a failure to achieve reduced air permeability due to the failure to obtain a required resin thickness on the surface of the coated fabric. A resin amount of more than 25 $g/m^2$ may decrease the flexibility of the coated fabric, not only impairing packageability, but also increasing the weight of the bag as a whole.

The top portion of the surface of the coated fabric for airbags according to the present invention preferably has an average resin thickness of 4 μm or more, and more preferably 6 μm or more in the warp and weft, yarn direction. The "top portion" refers to the thinnest portion in terms of resin film thickness in the warp or in the weft. In the present invention, it is preferred that the resin does not seep well inside the woven fabric, and that the resin be present on the entire coated surface of the woven fabric, in particular, on the top portion of the woven fabric with a relatively uniform film thickness. An average resin thickness of less than 4 μm may result in a failure to achieve reduced air permeability and flame retardancy. Although the upper limit is not particularly set, an average resin thickness of more than 25 μm makes it difficult to apply the resin by knife coating.

In the present invention, the method for applying a coating resin for use is a known method. From the standpoint of the ease of adjusting the coating amount and the impact of foreign matter (protruding objects) contamination, a knife-coating method is preferable; in particular, a knife-on-air method is most preferable. A knife-on-bed method is easy for allowing the resin to seep inside the woven fabric. However, the method is difficult to allow the resin to be present on the top portion of the coated surface of the woven fabric, thereby likely failing to achieve reduced air permeability, which is generally required in coated fabrics. In the present invention, the knife for use in a knife coating method has a knife blade with an edge shape such as a semicircular shape and an angular shape.

In knife coating by the knife-on-air method, the fabric tension in the direction in which the fabric advances is preferably 300 N/m or more and 800 N/m or less, and more preferably 400 N/m or more and 750 N/m or less. When the fabric tension in the direction in which the fabric advances is less than 400 N/m, the rippling at the ends of the base woven fabric become large, which likely makes a substantial difference in the coating amount between the middle part and the edge parts of the fabric. When the fabric tension in the direction in which the fabric advances is more than 800 N/m, interstices between the warp and the weft are closed, which makes it unable for the resin to be present, in the woven-mesh portions of the warp and the weft of the non-coated surface.

In the present invention, it is important that the push-in depth made by a knife is 1 mm or more and 6 mm or less. In the knife-on-air method, the push-in depth wade by a knife refers to the depth made when a knife is pushed downward from the upper surface of the bed positioned immediately before the knife, which is 0 mm in height. The push-in depth is more preferably 1.5 mm or more and 4.5 mm or less. When the push-in depth by a knife is less than 1 mm, the resin cannot be present in the woven-mesh portions of the warp and the weft of the non-coated surface, against the purpose of the present invention. When the push-in depth by a knife is more than 6 mm, the resin can easily seep into the woven fabric, but is difficult to present or the top portion of the coated surface of the woven fabric, resulting in a failure to achieve reduced air permeability, which is generally required in coated fabrics.

The method for drying and curing the applied coating agent may be a typical heating method, such as with hot air, infrared light, and microwave. Regarding the heating temperature and time period, it is sufficient if the temperature reaches the point at which the silicone resin is cured. Preferably, the heating temperature is 150° C. or more and 220° C. or less, and the heating time period is 0.2 minutes or more and 5 minutes or less.

Airbags prepared using the non-coated fabric for airbags or the coated fabric for airbags according to the present invention can be suitably used in, for example, driver-side airbags, front-passenger-side airbags, curtain airbags, side airbags, knee airbags, seat airbags, and reinforcing cloth. Thus, these products are also included in the scope of the present invention. Airbags prepared using the non-coated fabric for airbags or the coated fabric for airbags according to the present invention are preferably those that are a component required to be long particularly in the weft direction; this is because when a component long in the weft direction is cut out from the non-coated fabric for airbags or the coated fabric for airbags according to the present invention, these fabrics are less likely to have yarn slippage after being sewn. Specifically, side-curtain airbags are preferable. Additionally, because the non-coated fabric for airbags and coated fabric for airbags according to the present invention are particularly excellent in packageability, airbags particularly required to have packageability are also preferable. Specifically, driver-side airbags, front-passenger-side airbags, and curtain airbags are preferable. Airbags prepared using the non-coated fabric for airbags or the coated fabric for airbags according to the present invention are more preferably those that are a component required to be long in the weft direction and to have packageability. Specifically, side-curtain airbags are more preferable.

EXAMPLES

The present invention will be described in more detail below with reference to the Examples; however, the present invention is not limited to the following Examples, and appropriate modifications may certainly be made as long as they are within the concepts stated above and below. Such modifications are all within the technical scope of the present invention. The following are test methods for various properties used in the Examples below.

Crimp Ratio of Fabric

The measurement was performed irk accordance with the method described in JIS L 1096 (2010) 8.7.2B. The load applied was $1/10$ g per dtex.

Stiffness Based on Two Sheets of Fabric

One piece of the fabric was overlaid on the other piece in the same direction, and one end was sewn with a sewing thread (upper thread: 1400 dtex, lower thread: 940 dtex, pitch: 2.2 mm). The measurement was then performed in accordance with JIS L1096 (2010) 8.19.1A (45° C. cantilever method). Specifically, measurement was performed as described below.

Ten test specimens (about 20 mm×about 150 ram) were cut out from a sample in the warp direction end in the weft direction each, and two test specimens were overlaid one on top on the other. One end was sewn with a sewing thread (1400 dtex, lower thread: 940 dtex, pitch: 2.2 m). The five sewn test specimens in the warp direction and five test specimens in the weft direction were individually placed on a smooth horizontal table having a 45° C. slope at one end such that the short side of the test specimen was aligned with the scale baseline. Next, the test, specimen was allowed to gently slide toward the slope by an appropriate method. When the central point of one end of the test specimen came into contact with the slope, the position of the other end was read from the scale. The stiffness was indicated by the length (mm) over which the test specimen moved. The front and back surfaces of each of the five specimens were measured for stiffness.

Edgecomb Resistance Based on Two Sheets of Fabric

The measurement, was performed in accordance with ASTM D6479-15 with two layers of the fabric in the same direction. Specifically, a mark was made at a position of 5 mm from the edge of fabric samples, and each fabric sample was accurately pierced with needles in the position. Two sheets of the fabric were placed one over the other and measured. The edgecomb resistance in the warp direction was determined by piercing the fabric with pins along weft yarn, and measuring the maximum load when the weft yarn was shifted with the pins in the warp yarn direction. The edgecomb resistance in the weft direction was determined by piercing the fabric with pins along warp yarn, and measuring the maximum load when the warp yarn was shifted with the pins in the weft direction.

Weaving Density of Fabric

The measurement was performed in accordance with JIS L 1096 (2010) 8.6.1. More specifically, the sample was placed on a flat table and unnatural crimping and tension were removed. The number of warp yarn threads and weft yarn threads in a 2.54-cm section was counted at five different areas, and the average was calculated per unit length and determined to be the density.

Weight of Fabric

The measurement was performed in accordance with JIS L 1096 (2010) 8.4.1. Two test specimens (about 200 mm×200 mm) were taken frost the sample, the absolute dry mass (g) of each test specimen was weighed, and the mass (g/m$^2$) per m$^2$ was calculated. The average was determined to be the weight.

Packageability of Fabric

The measurement was performed according to ASTM D 6478-10 (2014). A specimen with a width (weft yarn direction) of 750±5 mm and a length (warp yarn direction) of 800 mm±5 mm was taken from the sample, a plate with a width of 145 mm and a thickness of 2 mm was placed along the end portion in the weft yarn direction, and the sample was folded along the weft yarn threads. This operation was performed five times to fold the specimen into an accordion shape. The plate was removed, and the folded sample was rotated 90° C. A plate with a width of 95 mm and a thickness of 2 mm was placed along the end portion in the warp yarn direction, and the woven fabric was then folded along the warp yarn threads. This operation was performed seven times to form the fabric into an accordion shape. The folded sample was placed in a storage box (inner dimension of bottom: 100 mm×150 mm.) The bulkiness (thickness) of the folded sample under a specific load was measured, and the packageability (cm³) was calculated using the following formula. The average of two measurements was determined to be the packageability. [T20+T40+T60+ . . . T180]*100*150/1000 (cm³) (Tα: Bulkiness of the sample under a load of αN (mm); measurement was performed with α in 20 increments))

Tensile Strength and Elongation at Maximum Force of Fabric

The measurement was performed in accordance with JIS L 1096 (2010) 8.12.1. The test was performed with a test specimen captured by a tensile tester under initial tension at a tension rate of 200 m/min (width of the test specimen; 50 mm, length of the test specimen between clamps; 200 mm) to measure the strength (N) and elongation (%) at the time that the fabric was torn apart. However, a case in which the specimen was torn apart within 10 mm from a clamp or abnormally torn apart was excluded.

Air Permeability of Fabric

The air permeability was measured at a pressure of 20 kPa with a high-pressure air permeability treasuring device (OEM Systems Co., Ltd.).

Coating Amount of Resin of Coated Fabric

After the resin was cured, a coated fabric was accurately sampled as a 5 cm×5 cm piece and immersed in a solvent for dissolving only the fibers of the base fabric (e.g., the solvent for polyamide 60 is hexafluoroisopropanol) to allow the fabric to dissolve. Subsequently, only the silicone-coated layer, which is an insoluble matter, was recovered and washed with acetone, followed by vacuum drying and measuring the sample weight. The amount of coating was indicated by mass per m² (g/m²).

Total Fineness of Synthetic-Fiber Multifilament (Yarn Removed

From the Fabric) Constituting Fabric for Airbags

The total fineness of synthetic-fiber multifilament (yarn removed from the fabric) constituting a fabric for airbags was determined as follows.

The warp yarn threads and weft yarn threads of the fabric obtained through a dry-finishing step were each fibrillated, and measurement was performed in accordance with JIS L 1013 (2010) 8.3.1. Specifically, a sample with a length of 90 cm was accurately taken with an initial tension applied. The absolute dry mass was weighed, and the fineness based on corrected weight (dtex) was calculated using the following formula. The average of rive measurements was determined to be the total fineness.

$F0=1000 \times m/0.9 \times (100+R0)/100$

F0: fineness based on corrected weight (dtex)
m: Absolute dry mass of sample (g)
R0: Official moisture content (%)

Tensile Strength and Elongation at Maximum Force of Synthetic-Fiber Multifilament (Yarn Removed from the Fabric) Constituting Fabric for Airbags The measurement was performed in accordance with JIS L 1013 (2010) 8.5. The sample was held loosely with the clamps of a tensile tester, and the load and elongation at the time that the sample was torn apart was measured.

Total Fineness of Original Yarn

The measurement was performed in accordance with JIS L 1013 (2010) 8.3.1. Specifically, a sample with a length of 90 cm was accurately taken with an initial tension applied, the absolute dry mass was weighed, and the fineness based on corrected weight (dtex) was calculated using the following formula. The average of five measurements was determined to be the total fineness.

$F0=1000 \times m/0.9 \times (100+R0)/100$

F0: Fineness based on corrected weight (dtex)
L: Sample length (m)
m: Absolute dry mass of sample (g)
R0: Official moisture content (%)

Tensile Strength and Elongation at Maximum Force of Original Yarn

The measurement was performed in accordance with JIS L 1013 (2010) 8.5. The sample was held loosely with the clamps of a tensile tester, and the load and elongation at the time that the sample was torn apart was measured.

Boiling-Water Shrinkage Rate of Original Yarn

The measurement was performed in accordance with the boiling-water shrinkage rate method B prescribed in JIS L 1013 (2010). An initial tension was applied to a sample, and two points were marked by accurately measuring the length of 500 mm. Thereafter, the initial tension was removed, and the sample was immersed in hot water at 100° C. for 30 minutes. Thereafter, the sample was taken out, and gently wiped out of water with blotting paper or a cloth. After the sample was air-dried, the initial tension was applied again, and the length between the two points was measured to calculate the dimensional change rate by boiling water (%) using the following formula. The average of three measurements was determined to be the boiling water shrinkage rate.

$\Delta L = (L-500)/500 \times 100$

ΔL: Boiling-water shrinkage rate (%); L: Length between two points (mm)

Example 1-1

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate of 9.3% (the monofilament cross-section was round) as warp and weft yarn threads by using a water-jet loom by setting the weaving density to 53.0 yarn threads/2.54 cm for both warp and weft yarn threads, and the conditions in the weaving process to those shown in Table 1. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Example 1-2

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate of 9.3% (the monofilament cross-section was round) as warp and weft yarn threads by using a water-jet loom by setting the weaving density to 52.5 yarn threads/2.54 cm for both warp and weft yarn threads, and the conditions in the weaving process to those shown in Table 1. Thereafter, without drying, the fabric was allowed to pass through a hot water shrink tank at 93° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 1-1

A plain-weave fabric was woven from nylon 66 original yarn threads having a fineness of 470 dtex/136f, a tensile strength of 8.6 cN/dtex, an elongation at maximum force of 20.0%, and a boiling-water shrinkage rate of 9.3% (the monofilament cross-section was round) as warp and weft yarn threads by using a water-jet loom by setting the weaving density to 53 yarn threads/2.54 an for both warp and weft yarn threads, and the conditions in the weaving process to those shown in Table 1. Thereafter, without drying, the fabric was allowed to pass through a hot water shrink tank at 80° C., and then dried at 110° C. for 40 seconds in a heated drum. Table 1 shows the physical properties of the obtained fabric.

Comparative Example 1-2

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate of 9.3% (the monofilament cross-section was round) as warp and weft yarn threads by using a water-jet loom by setting the weaving density to 50.5 yarn threads/2.54 cm in the warp direction and the weaving density to 49.5 yarn threads/2.54 cm in the weft direction, and the conditions in the weaving process to those shown in Table 1. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

Comparative Example 1-3

A plain-weave fabric was woven from nylon 66 original yarn threads having a fineness of 470 dtex/144f, a tensile strength of 8.3 cN/dtex, an elongation at maximum force of 21%, and a boiling-water shrinkage rate of 9.3% (the monofilament cross-section was round) as weft and warp yarn threads by using a water-jet loom by setting the weaving density to 52.5 yarn threads/2.54 cm in the weft direction and the weaving density to 50.0 yarn threads/2.54 cm in the warp direction, and the conditions in the weaving process to those shown in Table 1. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer. Table 1 shows the physical properties of the obtained fabric.

TABLE 1

| Item | | Unit | Ex. 1-1 | Ex. 1-2 | Comp. Ex. 1-1 | Comp. Ex. 1-2 | Comp. Ex. 1-3 |
|---|---|---|---|---|---|---|---|
| Original yarn total fineness | | dtex | 470 | 470 | 470 | 470 | 470 |
| Number of original yarn filaments | | yarn | 144 | 144 | 136 | 144 | 144 |
| Original yarn single filament fineness | | dtex | 3.3 | 3.3 | 3.5 | 3.3 | 3.3 |
| Original yarn cross sectional shape | | — | Round cross section | Round cross section | Round cross section | Round cross section | Round cross section |
| Original yarn tensile strength | | cN/dtex | 8.3 | 8.3 | 8.6 | 8.3 | 8.3 |
| Original yarn elongation at maximum force | | % | 21.0 | 21.0 | 20.0 | 21.0 | 21.0 |
| Original yarn boiling-water shrinking rate | | % | 9.3 | 9.3 | 9.3 | 9.3 | 9.3 |
| Weaving loom | | — | WJL | WJL | WJL | WJL | WJL |
| Determined density | warp | yarn/2.54 cm | 53.0 | 52.5 | 53.0 | 50.5 | 52.5 |
| | weft | | 53.0 | 52.5 | 53.0 | 49.5 | 50.0 |
| Warp tension in weaving | | cN/yarn | 150 | 180 | 160 | 120 | 140 |
| Dwell angle in weaving | | ° | 85 | 60 | 0 | 0 | 0 |
| Warp line height in weaving | | mm | 38 | 30 | 60 | 15 | 15 |
| Easing degree in weaving | | mm | 5 | 7.5 | 2.5 | 2.5 | 2.5 |
| Easing timing in weaving | | ° | 330 | 330 | 310 | 310 | 310 |
| Cross timing in weaving | | ° | 330 | 330 | 330 | 330 | 330 |
| Shrinking treatment system | | — | Hot water layer | Hot water layer | Hot water layer | Hot water layer | Hot water layer |
| Treatment temperature | | ° C. | 98 | 98 | 80 | 98 | 98 |
| Total fineness of Yarn removed from the fabric | warp | dtex | 482 | 480 | 482 | 483 | 480 |
| | weft | | 481 | 483 | 483 | 480 | 480 |
| Number of yarn removed from the fabric filaments | warp | Yarn | 144 | 144 | 136 | 144 | 144 |
| | weft | | 144 | 144 | 136 | 144 | 144 |
| Single filament fineness of yarn removed from the fabric | warp | dtex | 3.3 | 3.3 | 3.5 | 3.4 | 3.3 |
| | weft | | 3.3 | 3.4 | 3.6 | 3.3 | 3.3 |
| Tensile strength of yarn | warp | cN/dtex | 7.3 | 7.4 | 7.0 | 7.1 | 7.3 |

TABLE 1-continued

| Item | Unit | | Ex. 1-1 | Ex. 1-2 | Comp. Ex. 1-1 | Comp. Ex. 1-2 | Comp. Ex. 1-3 |
|---|---|---|---|---|---|---|---|
| removed from the fabric | weft | | 7.4 | 7.3 | 7.4 | 7.4 | 7.5 |
| Elongation at maximum force | warp | % | 27 | 28 | 28 | 26 | 27 |
| of yarn removed from the fabric | weft | | 24 | 24 | 27 | 25 | 29 |
| Crimp ratio | warp | % | 13.1 | 14.0 | 11.2 | 10.0 | 11.1 |
| | weft | % | 4.6 | 5.2 | 3.6 | 4.4 | 3.9 |
| Stiffness based on two layers of fabric (warp yarn direction) | mm | | 97 | 95 | 101 | 95 | 97 |
| Edgecomb resistence based on two layers of fabric (warp yarn direction) | N | | 1562 | 1608 | 1320 | 1201 | 1281 |
| Weight | g/m$^2$ | | 237 | 241 | 235 | 214 | 218 |
| Weaving density | warp | yarn/2.54 cm | 57.9 | 57.2 | 57.0 | 53.3 | 54.1 |
| | weft | yarn/2.54 cm | 57.4 | 57.2 | 57.0 | 53.5 | 53.7 |
| Cover factor | — | | 2399 | 2379 | 2376 | 2223 | 2241 |
| Tensile strength | warp | N/cm | 766 | 769 | 760 | 753 | 755 |
| | weft | N/cm | 773 | 799 | 772 | 781 | 775 |
| Elongation at maximum force | warp | % | 38 | 41 | 37 | 36 | 36 |
| | weft | % | 26 | 30 | 26 | 29 | 29 |
| Air permeability | 20 Kpa | L/cm$^2$/min | 0.34 | 0.33 | 0.36 | 0.43 | 0.43 |
| Packageability | | cm$^3$ | 2727 | 2680 | 2930 | 2138 | 2371 |

The fabric of Examples 1-1 and 1-2 had excellent yarn slippage resistance. The fabric further had excellent results in the packageability test. The present invention having such excellent yarn slippage resistance after sewing and excellent packageability are useful as non-coated fabric for airbags.

Example 2-1

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate of 9.3%, (the monofilament cross-section was round) as warp and weft yarn threads by using a water-jet loom by setting the weaving density to 53.0 yarn threads/2.54 cm for both the warp yarn threads and weft yarn threads, and the conditions in the weaving process to those shown in Table 2. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer.

Next, a solvent-free silicone resin composition was applied to one side of this woven fabric by a knife-on-air method so that the fabric had a coating amount of 15 g/m$^2$. Subsequently, curing treatment was performed at 190° C. for 2 minutes, thereby obtaining a coated fabric. The characteristics of the obtained coated fabric were evaluated. Table 2 shows the physical properties of the obtained fabric.

Example 2-2

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate or 9.3% (the monofilament cross-section was round) as warp and weft yarn threads by using a water-jet loom by setting the weaving density to 52.5 yarn threads/2.54 on for both the warp yarn threads and weft yarn threads, and the conditions in the weaving process to those shown in Table 2. Thereafter, without drying, the fabric was allowed to pass through a hot water shrink tank at 98° C., and then to pass through a dry finishing process in which the first step was adjusted to have a temperature T1 or 120° C., and the second step was adjusted to have a temperature T2 of 125° C., using a two-step suction drum dryer.

Next, as in Example 2-1, a solvent-free silicone resin composition was applied to one side of the woven fabric by a knife-on-air method so that the fabric had a coating amount of 15 g/m$^2$. Subsequently, curing treatment was performed at 190° C. for 2 minutes, thereby obtaining a coated fabric. The characteristics of the obtained coated fabric were evaluated. Table 2 shows the physical properties of the obtained fabric.

Example 2-3

A plain-weave fabric was woven from nylon 66 original yarn threads having a fineness of 470 dtex/144f, a tensile strength of 8.3 cN/dtex, an elongation at maximum force of 21.0%, and a boiling-water shrinkage rate of 9.3% (the monofilament cross-section was round) as warp and weft yarn threads by using a water-jet loom by setting the weaving density to 53.0 yarn threads/2.54 cm for both the warp yarn threads and weft yarn threads, and the conditions in the weaving process to those shown in Table 2. Thereafter, without drying, the fabric was allowed to pass through a hot water shrink tank at 98° C., and then to pass through a dry finishing process in which the first step was adjusted to have a temperature T1 of 120° C., and the second step was adjusted to have a temperature T2 of 125° C., using a two-step suction drum dryer.

Next as in Example 2-1, a solvent-free silicone resin composition was applied to one side of the woven fabric by a knife-on-air method so that the fabric had a coating amount of 25 g/m$^2$. Subsequently, curing treatment, was performed at 190° C. for 2 minutes, thereby obtaining a coated fabric. The characteristics of the obtained coated fabric were evaluated. Table 2 shows the physical properties of the obtained fabric.

Comparative Example 2-1

A plain-weave fabric was woven from nylon 66 original yarn threads having a fineness of 470 dtex/136f, a tensile strength of 8.6 cN/dtex, an elongation at maximum force of 20.0%, and & boiling-water shrinkage rate of 9.3% (the monofilament cross-section was round) as warp and weft yarn threads by using a water-jet loom by setting the weaving density to 53 yarn threads/2.54 cm for both the warp yarn threads and weft yarn threads, and the conditions in the weaving process to those shown in Table 2. Thereafter, without drying, the fabric was allowed to pass through a hot water shrink tank at 80° C. C, and then dried in a heated drum at 110° C. for 40 seconds.

Next, as in Example 2-1, a solvent-free silicone resin composition was applied to one side of the woven fabric by a knife-on-air method so that the fabric had a coating amount of 15 g/m². Subsequently, curing treatment was performed at 190° C. for 2 minutes, thereby obtaining a coated fabric. The characteristics of the obtained coated fabric were evaluated. Table 2 shows the physical properties of the obtained fabric.

| Item | | Unit | Ex. 2-1 | Ex. 2-2 | Ex. 2-3 | Comp. Ex. 2-1 |
|---|---|---|---|---|---|---|
| Original yarn total fineness | | dtex | 470 | 470 | 470 | 470 |
| Number of original yarn filaments | | yarn | 144 | 144 | 144 | 136 |
| Original yarn single filament fineness | | dtex | 3.3 | 3.3 | 3.3 | 3.5 |
| Original yarn cross sectional shape | | — | Round cross section | Round cross section | Round cross section | Round cross section |
| Original yarn tensile strength | | cN/dtex | 8.3 | 8.3 | 8.3 | 8.6 |
| Original yarn elongation at maximum force | | % | 21.0 | 21.0 | 21.0 | 20.0 |
| Original yarn boiling-water shrinking rate | | % | 9.3 | 9.3 | 9.3 | 9.3 |
| Weaving loom | | — | WJL | WJL | WJL | WJL |
| Determined density | warp | yarn/2.54 cm | 53.0 | 52.5 | 53.0 | 53.0 |
| | weft | | 53.0 | 52.5 | 53.0 | 53.0 |
| Warp tension in weaving | | cN/yarn | 150 | 180 | 150 | 160 |
| Dwell angle in weaving | | ° | 85 | 60 | 85 | 0 |
| Warp line height in weaving | | mm | 38 | 30 | 38 | 60 |
| Easing degree in weaving | | mm | 5 | 7.5 | 5 | 2.5 |
| Easing timing in weaving | | ° | 330 | 330 | 330 | 310 |
| Cross timing in weaving | | ° | 330 | 330 | 330 | 330 |
| Shrinking treatment system | | — | Hot water layer | Hot water layer | Hot water layer | Hot water layer |
| Treatment temperature | | ° C. | 98 | 98 | 98 | 80 |
| Amount of coating agent applied | | g/m² | 15 | 15 | 25 | 15 |
| Total fineness of Yarn removed from the fabric | | dtex | 482 / 481 | 480 / 483 | 482 / 481 | 482 / 483 |
| Number of yarn removed from the fabric filaments | | Yarn | 144 / 144 | 144 / 144 | 144 / 144 | 136 / 136 |
| Single filament fineness of yarn removed from the fabric | | dtex | 3.3 / 3.3 | 3.3 / 3.4 | 3.3 / 3.3 | 3.5 / 3.6 |
| Tensile strength of yarn removed from the fabric | | cN/dtex | 7.3 / 7.4 | 7.4 / 7.3 | 7.3 / 7.4 | 7.0 / 7.4 |
| Elongation at maximum force of yarn removed from the fabric | | % | 27 / 24 | 28 / 24 | 27 / 24 | 28 / 27 |
| Number of yarn removed from the fabric filaments | warp | yarn | 144 | 144 | 136 | 144 |
| | weft | | 144 | 144 | 136 | 144 |
| Single filament fineness of yarn removed from the fabric | warp | dtex | 3.3 | 3.3 | 3.3 | 3.5 |
| | weft | | 3.3 | 3.4 | 3.3 | 3.6 |
| Tensile strength of yarn removed from the fabric | warp | cN/dtex | 7.3 | 7.4 | 7.3 | 7.0 |
| | weft | | 7.4 | 7.3 | 7.4 | 7.4 |
| Elongation at maximum force of yarn removed from the fabric | warp | % | 27 | 28 | 27 | 28 |
| | weft | | 24 | 24 | 24 | 27 |
| Crimp ratio | warp | % | 13.1 | 14.0 | 13.1 | 11.2 |
| | weft | % | 4.6 | 5.2 | 4.6 | 3.6 |
| Stiffness based on two layers of fabric (warp yarn direction) | | mm | 87 | 85 | 83 | 92 |
| Edgecomb resistence based on two layers of fabric (warp yarn direction) | | N | 1630 | 1650 | 1764 | 1420 |
| Weight | | g/m² | 257 | 271 | 266 | 255 |
| Weaving density | warp | yarn/2.54 cm | 58.1 | 57.4 | 58.1 | 57.2 |
| | weft | yarn/2.54 cm | 57.5 | 57.4 | 57.5 | 57.2 |
| Cover factor | | — | 2406 | 2390 | 2406 | 2384 |
| Tensile strength | warp | N/cm | 769 | 797 | 794 | 763 |
| | weft | N/cm | 780 | 801 | 775 | 780 |

-continued

| Item | | Unit | Ex. 2-1 | Ex. 2-2 | Ex. 2-3 | Comp. Ex. 2-1 |
|---|---|---|---|---|---|---|
| Elongation at maximum force | warp | % | 36 | 42 | 39 | 36 |
| | weft | % | 28 | 34 | 30 | 29 |
| Air permeability | | 20 Kpa | L/cm$^2$/min | 0.00 | 0.00 | 0.00 | 0.00 |
| Packageability | | cm3 | 2946 | 2915 | 2962 | 3149 |

The fabric of Examples 2-1 to 2-3 had excellent yarn slippage resistance. These fabrics also achieved excellent results in the packageability test. The present invention having excellent yarn slippage resistance after sewing, and excellent packageability is useful as a coated fabric for airbags.

The embodiments of the present invention and the Examples are described above; however, the embodiments and the Examples disclosed as above are examples in all respects and are not restrictive. The scope of the present invention is shown in the claims and encompasses concepts equivalent to the scope of the claims, as well as all modifications within the scope.

INDUSTRIAL APPLICABILITY

According to the present invention, by determining the crimp ratio of a non-coated fabric for airbags and a coated fabric for airbags in the warp direction, a fabric for airbags that has increased edgecomb resistance in the warp direction even when the fabric has a high weaving density, has decreased stiffness in the warp direction, is less likely to have yarn slippages after being sewn, and can be compactly stored in a module cars be obtained, thus making significant contribution industry.

The invention claimed is:

1. A non-coated fabric for airbags having a crimp ratio of 12% or more in the warp direction and a crimp ratio of 6% or less in the weft direction;
   wherein the non-coated fabric is a base fabric of a side-curtain airbag, and the non-coated fabric has an edgecomb resistance of 1500 N or more in the warp yarn direction based on two layers of the non-coated fabric.

2. The non-coated fabric for airbags according to claim 1, having a stiffness of 100 mm or less in the warp yarn direction as determined based on two layers of the non-coated fabric by a cantilever method.

3. The non-coated fabric for airbags according to claim 1, having an edgecomb resistance of 1550 N or more in the warp yarn direction based on two layers of the non-coated fabric.

4. The non-coated fabric for airbags according to claim 1, comprising a synthetic-fiber multifilament that has a total fineness of 400 dtex or more and 600 dtex or less,
   the non-coated fabric for airbags having
      a weaving density of 56 yarn threads/2.54 cm or more in both the warp direction and the weft direction, and
      a cover factor of 2150 or more and 2600 or less.

5. An airbag comprising the non-coated fabric for airbags according to claim 1.

6. A coated fabric for airbags having a crimp ratio of 12% or more in the warp direction and a crimp ratio of 6% or less in the weft direction;
   wherein the coated fabric is a base fabric of a side-curtain airbag, and the coated fabric has an edgecomb resistance of 1600 N or more in the warp yarn direction based on two layers of the non-coated fabric.

7. The coated fabric for airbags according to claim 6, having a stiffness of 90 mm or less in the warp yarn direction as determined based on two layers of the coated fabric by a cantilever method.

8. The coated fabric for airbags according to claim 6, having an edgecomb resistance of 1650 N or more in the warp yarn direction based on two layers of the coated fabric.

9. The coated fabric for airbags according to claim 6, comprising a synthetic-fiber multifilament that has a total fineness of 400 dtex or more and 600 dtex or less,
   the coated fabric having
      a weaving density of 56 yarn threads/2.54 cm or more in both the warp direction and the weft direction, and
      a cover factor of 2150 or more and 2600 or less.

10. The coated fabric for airbags according to claim 6, wherein the amount of a silicone resin applied is 5 g/m$^2$ or more and 25 g/m$^2$ or less.

11. An airbag comprising the coated fabric for airbags according to claim 6.

12. A non-coated fabric for airbags having a crimp ratio of 12% or more in the warp direction and a crimp ratio of 6% or less in the weft direction;
   wherein the non-coated fabric is a base fabric of a side-curtain airbag, and the non-coated fabric has a weaving density of 56 yarn threads/2.54 cm or more in both the weft direction and the warp direction.

* * * * *